United States Patent

Asano et al.

[11] 3,922,700
[45] Nov. 25, 1975

[54] FILM CASSETTE

[75] Inventors: Yoshio Asano, Nishinomiya;
Kazunobu Kato, Minami-ashigara;
Yasumichi Ito, Minami-ashigara;
Kazutaka Yoshida,
Minami-ashigara, all of Japan

[73] Assignee: Fuji Photo Film Co., Ltd.,
Minami-ashigara, Japan

[22] Filed: Feb. 6, 1974

[21] Appl. No.: 440,219

[30] Foreign Application Priority Data
Feb. 10, 1973 Japan .............................. 48-16899
Feb. 10, 1973 Japan .............................. 48-16900

[52] U.S. Cl. ................. 354/276; 96/201; 206/455;
354/174; 354/282
[51] Int. Cl.² ........................................ G03B 17/26
[58] Field of Search ........... 354/275, 276, 277, 282,
354/283, 170, 173, 174, 303, 304, 212, 86,
65; 96/76 C, 201; 355/28, 72, 73; 206/316,
455; 221/277, 281; 271/149, 3, 3.1, 8, 10;
312/39, 50; 250/315, 468, 470, 471,
475–477; 214/301, 310

[56] References Cited
UNITED STATES PATENTS
3,872,485    3/1975    Asano .......................... 354/174 X Primary Examiner—Fred L. Braun
Assistant Examiner—Kenneth C. Hutchison
Attorney, Agent, or Firm—Sughrue, Rothwell, Mion, Zinn & Macpeak

[57] ABSTRACT

A film cassette for containing monosheets which comprises a protective case having a front opening through which a foremost monosheet in said cassette may be exposed, sheet having a light-proof portion and an open or transparent portion provided between said front opening of said case, and the position which the foremost monosheet is in when said cassette is loaded and means for moving said sheet back and forth between a position in which said light-proof portion is in line with said front opening, and a position in which said open or transparent portion is in line with said front opening.

4 Claims, 35 Drawing Figures

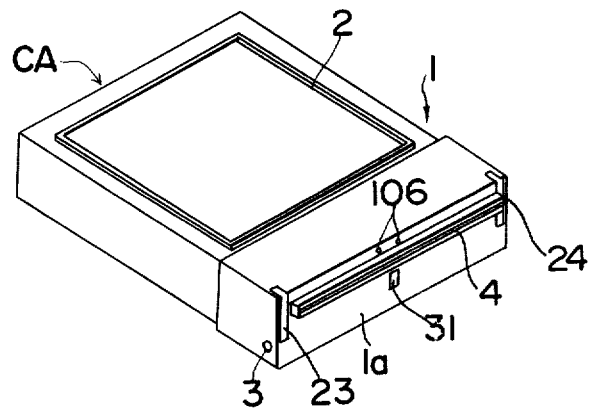
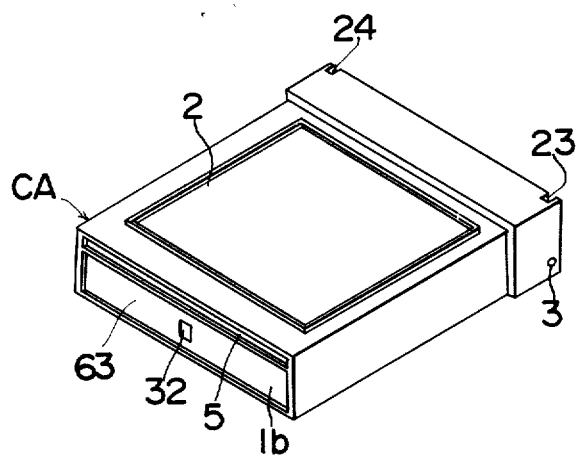
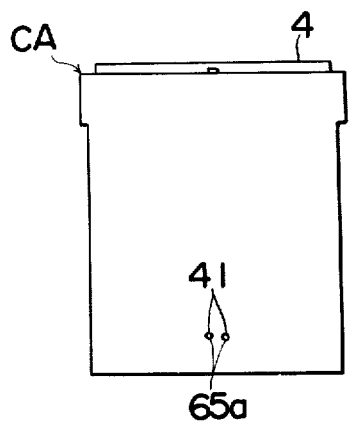
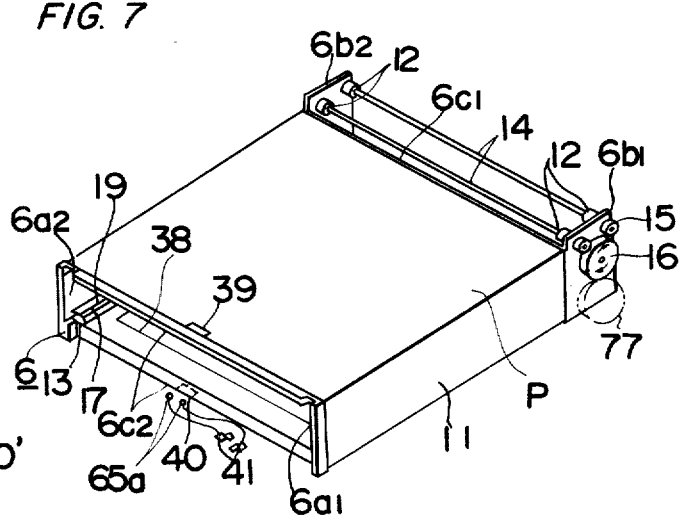
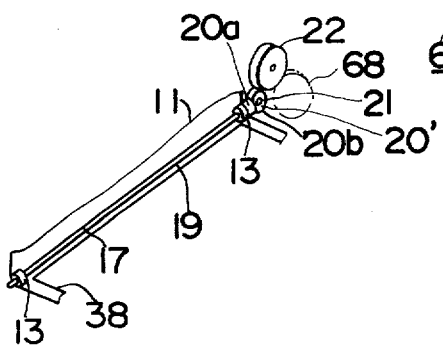

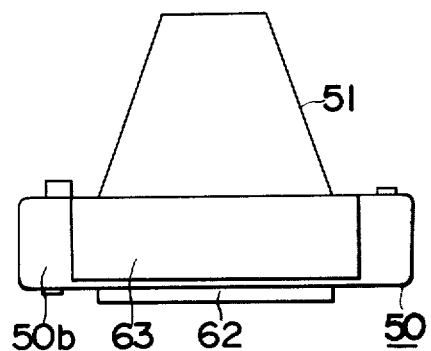
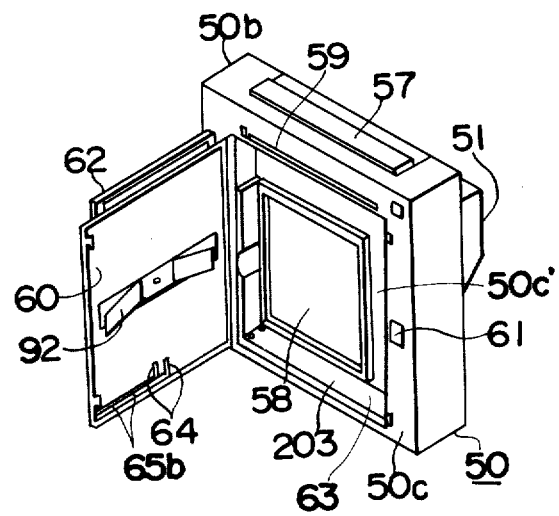
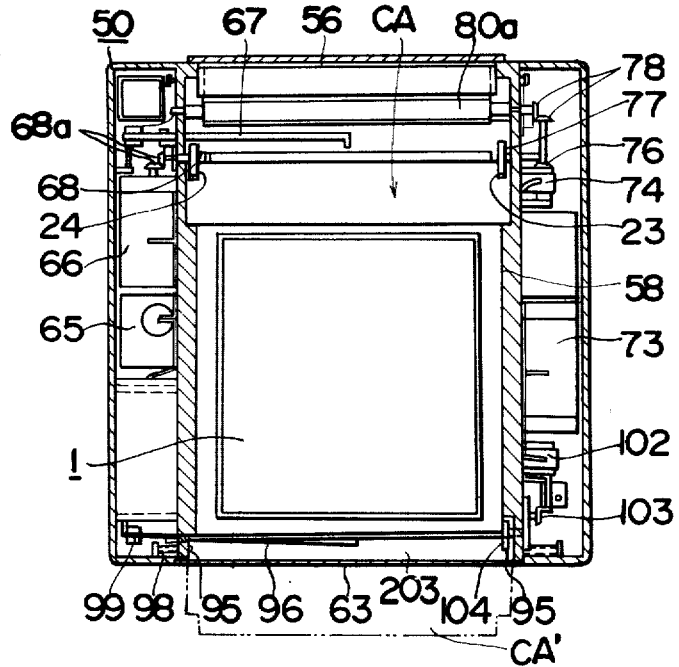

FILM CASSETTE

The present invention relates to a film cassette, and more particularly to an improved monosheet film cassette which may be recharged with supplementary monosheets and which also may be loaded or unloaded into or from a camera any number of times without detriment to monosheets contained therein.

A comparatively recent advance in the photographic art has been the provision of a type of film each unit of which comprises a combination of a negative film portion and a positive film portion associated with a sac containing a solution of photographic processing chemicals. Such film, when employed in a special type of camera, makes it possible to obtain a positive image of an object on the positive film portion almost immediately after the negative film portion has been exposed to light reflected from the object. Such film goes under a variety of popular or trade names, such as instant-print film, film-sheet, monosheet, or similar appellations. The special type of camera associated with this type of film is also referred to by a number of different names in the literature. For the purposes of the present description, this type of film will be referred to as "monosheet," and a camera used in association therewith will be referred to as an "auto-process camera."

Monosheets are conveniently provided as separate sheets packed in a cassette which is loadable in an auto-process camera. Alternatively, a certain number of monosheet may be provided in continuous connection with one another and contained in a cartridge, which is similarly loadable in an auto-process camera.

Whereas many advances have been made relative to monosheets themselves, by the provision of monosheets having improved qualities, or different speeds, or sensitivities, it may be said that progress relevant to cassettes (or cartridges) for containing monosheets has been relatively slight. Two main disadvantages of conventional monosheet cassettes are that the cassettes are not rechargeable or reloadable. That is, it is not possible to insert supplementary monosheets into a cassette, when required, and also, if a cassette previously loaded into a camera and still containing unused monosheets is removed from the camera, the remaining monosheets become exposed, or partially exposed, and hence unuseable. Because of this, if, at a time when a photographer wishes to take 6 – 8 shots in rapid succession, there are, for example, only 2 – 3 unexposed monosheets remaining in a cassette loaded into a camera, the photographer must either renounce taking the required number of shots or, by ejecting the cassette which is already loaded and loading a new, full cassette, waste 2 – 3 monosheets. In one case, the photographer has the disappointment of not taking the required number of shots, and the adoption of the second alternative is obviously disadvantageous economically. A photographer is faced with a similar problem when, after initial loading of a cassette containing monosheets having a certain sensitivity, he or she wishes to photograph a scene or object requiring monosheets having a different sensitivity, or other characteristics, and there are still monosheets remaining in the initially loaded cassette. In this case also, the photographer must either waste a certain number of monosheets or forego taking the desired photographs of a particular scene or object. Another disadvantage of conventional film cassettes is that they not infrequently cause breakage or jamming of monosheet forwarding means provided within the camera, particularly when a cassette is removed from a camera before all the monosheets provided therein have been used. A further disadvantage of conventional film cassettes is that they frequently require removal of monosheets therefrom to be effected by friction rollers or similar means which are provided in the auto-process camera and act through a wall of the cassettes. In this configuration the walls of the casettes must be made extremely thin, which means that they are liable to breakage and do not always provide sufficient protection to monosheets prior to loading in a camera.

It is accordingly an object of the present invention to provide an improved film cassette.

It is another object of the invention to provide a film cassette having a moveable means which protects monosheets in the cassette from exposure to light prior to loading of the cassette into a camera, and which is automatically moved to a position to permit, or back to a position to prevent, exposure of the monosheets upon loading or temporary removal of the cassette into or from a camera.

It is another object of the invention to provide a film cassette into which supplementary monosheets may be supplied, in accordance with requirements of a situation, without removal of the cassette from a camera into which it has been loaded.

It is yet another object of the present invention to provide a film cassette possessing a monosheets drive means which is provided within the cassette and enclosed in a cassette outer case of suitable strength and which is actuable by a simple drive means provided within a camera.

It is a still further object of the invention to provide a film cassette that is lightweight, simple in construction, and cheap.

In accomplishing these and other objects, there is provided, according to the present invention, a film cassette comprising a protective case, inner frame, and light-proof sheet. The protective case comprises a front opening, through which monosheets may be exposed, a spring or other means for forwarding successive monosheets to a foremost position for exposure, a protuberant extraction slit which is at the top of the case and in line with the position of a foremost monosheet in the cassette, a drive means which is located adjacent to the extraction slit and is actuable by a means provided within a camera to drive a foremost exposed monosheet through the extraction slit, and a recessed recharge slit which is formed at the bottom of the case and is complementary in shape and dimensions to the extraction slit, whereby the extraction slit of one cassette may fit into the recharge slit of another cassette and supplementary monosheets may be supplied from the former cassette to the latter. The frame is contained within the protective case, the light-proof sheet is wound around the frame and monosheets are contained inside the frame. The light-proof sheet comprises an opening equal in dimensions to the front opening of the protective case, and it may be driven by a drive means which is provided on the frame and is actuable by a means provided in a camera, so as to move back and forth between a position in which the opening in the partially light-proof sheet is in line with the front opening of the protective case and a position in which it is out of line with the front opening. The drive means is actuated upon closure or opening of the camera back cover and is stopped upon contact of detection foils attached to the light-proof sheet with terminals which are provided in the cassette and connect to control terminals provided in the camera. Accordingly, the light-proof sheet is wound to a position to permit exposure of monosheets when the cassette is loaded into a camera and the camera back cover is closed, and it is wound to a position to prevent exposure of monosheets when the camera back cover is opened and the cassette is removed.

These and other objects and features of the present invention will become apparent from the following description taken by way of example with reference to the accompanying drawings, in which:

FIG. 2 is a cross-sectional view taken along the line II — II of FIG. 1;

FIGS. 4 and 5 are perspective views of the film cassette of FIG. 1 as seen from the top and the bottom, respectively;

FIG. 6 is a rear view of the film cassette of FIG. 1;

FIG. 7 is a perspective view of a light-proof sheet with associated apparatus employed in the film cassette of FIG. 1;

FIG. 8 is a perspective view of friction rollers to drive the light-proof sheet of FIG. 7;

Figure 1:
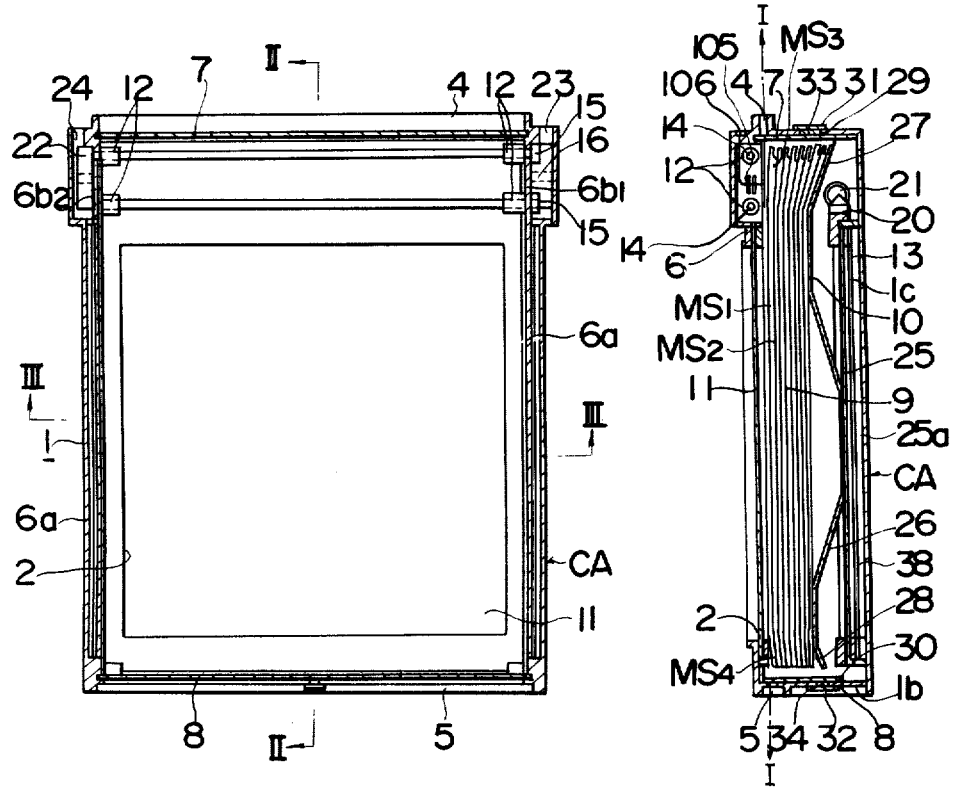
FIG. 1 is a plan view, partially broken away and cross-sectional along the line I — 1 of FIG. 2, of a film cassette according to one embodiment of the present invention.
Figure 12A:
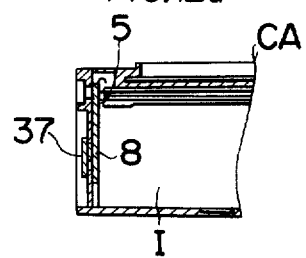
Figure 12B:
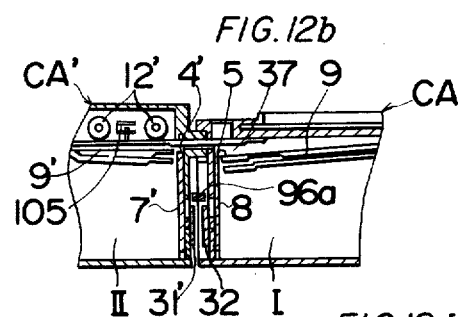
Figure 12C:
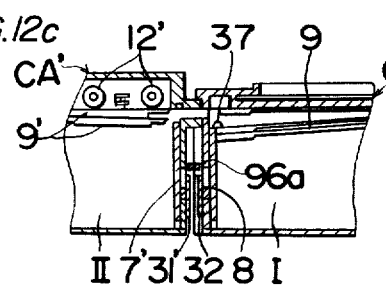
Figure 12D:
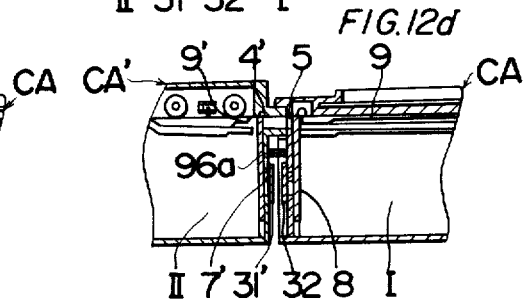
Figure 12E:
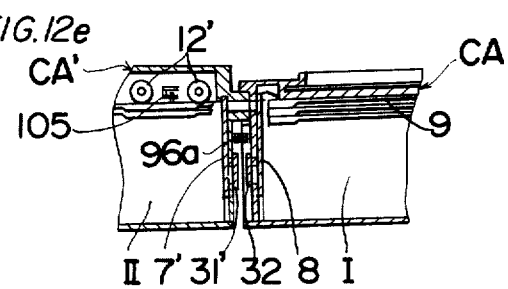
Figure 13:
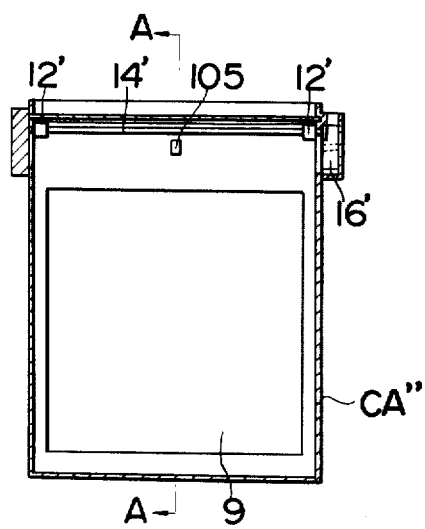
Figure 14:
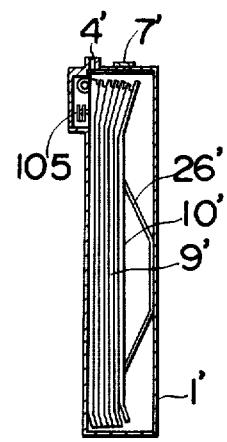
Figure 15:
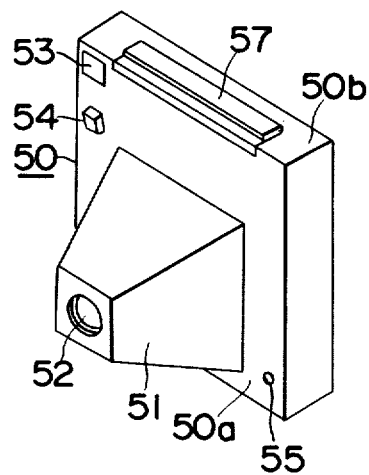
Figure 16:
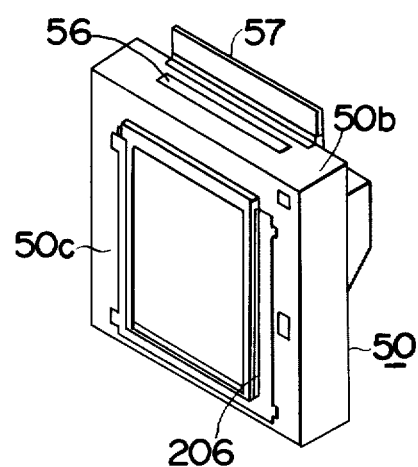
Figure 20:
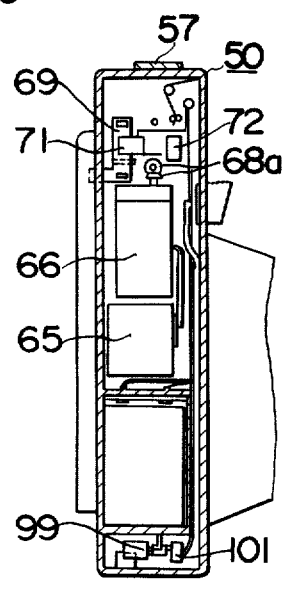
Figure 21:
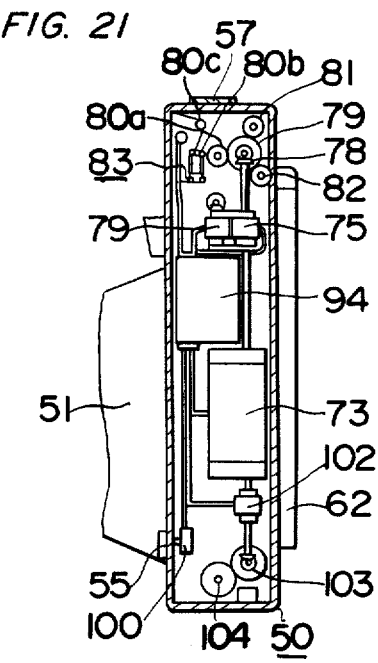
Figure 22:
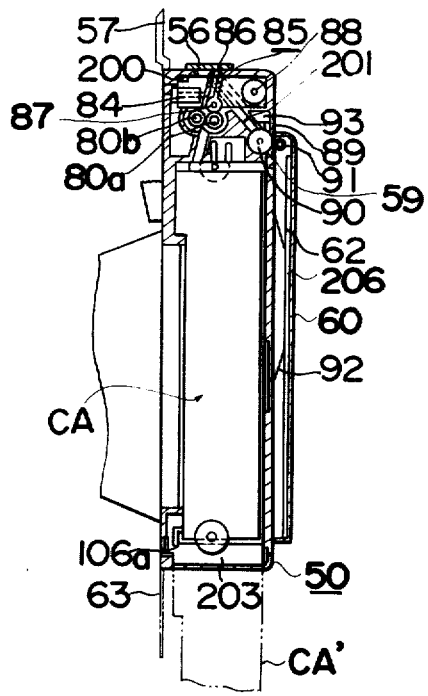
Figure 23:
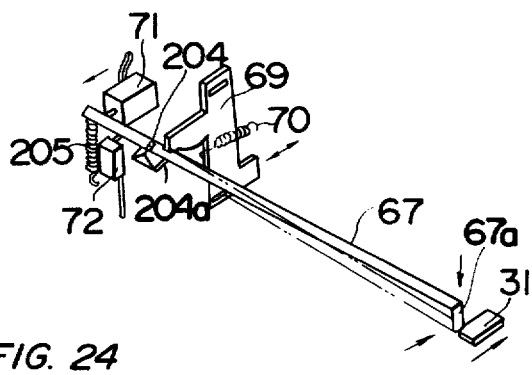
Figure 24:
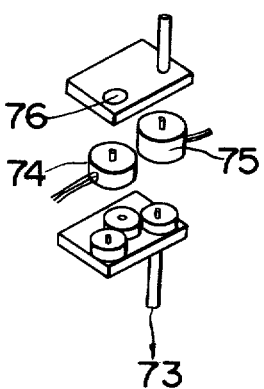
Figure 25A:
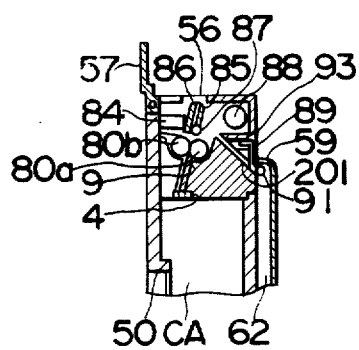
Figure 25B:
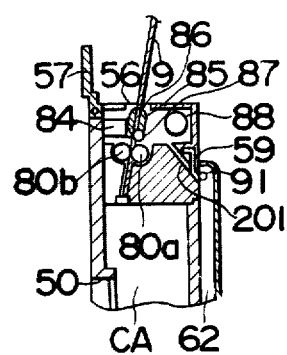
Figure 25C:
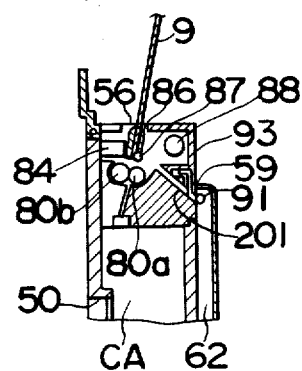
Figure 25D:
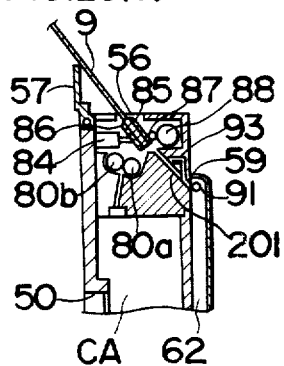
Figure 25E:
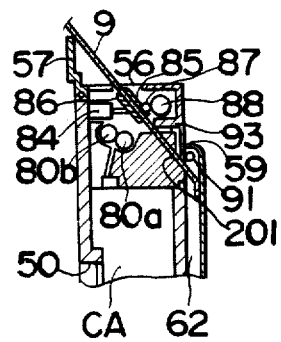
Figure 25F:
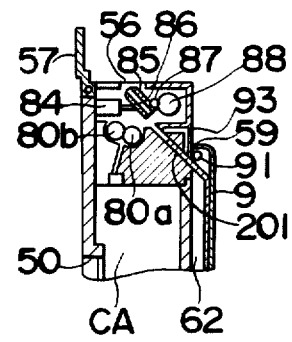
Figure 26:
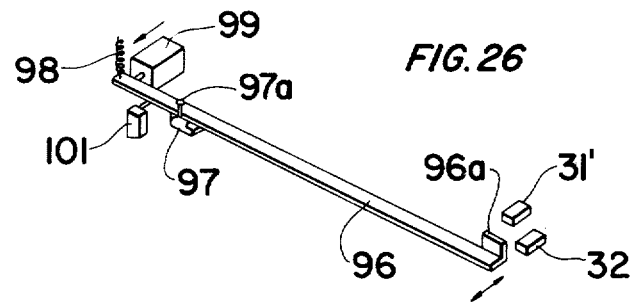

FIG. 12, (a) to (e), are cross-sectional views, partially broken away, of the film cassette of FIG. 1 for illustrating recharging of the film cassette;

FIG. 13 is a plan view, partially broken away, of a film cassette used exclusively as a recharge cassette in FIG. 12;

FIG. 14 is a cross-sectional view taken along the line XIV — XIV of FIG. 13;

FIG. 15 is a front perspective view of an auto-process camera useable in association with the film cassette of FIG. 1;

FIG. 16 is a rear prespective view of the auto-process camera of FIG. 15;

FIG. 17 is a bottom view of the auto-process camera of FIG. 15;

FIG. 18 is a view similar to FIG. 16, but with the back cover open;

FIG. 19 is a plan view, partially broken away, of the film cassette of FIG. 1 located in the auto-process camera of FIG. 15;

FIG. 20 is a cross-sectional view taken along the line XX — XX of FIG. 19;

FIG. 21 is a cross-sectional view taken along the line XXI — XXI of FIG. 19;

FIG. 22 is a cross-sectional view, partially broken away, of the auto-process camera of FIG. 15;

FIG. 23 is a perspective view of a push-plate and associated apparatus employed in the auto-process camera of FIG. 15;

FIG. 24 is a perspective view of clutches employed in the auto-process camera of FIG. 15;

FIG. 25, (a) to (f), are cross-sectional views, partially broken away, of the auto-process camera of FIG. 15 for illustrating withdrawal of an exposed monosheet from the film cassette of FIG. 1; and FIG. 26 is a perspective view of actuation pierces and associated apparatus employed in the auto-process camera of FIG. 15.

Before proceeding with the description, it is to be noted that throughout the separate attached drawings like numbers refer to like parts. Also, for the purposes of the descriptions, terms such as top, bottom, upwards, downwards, front, rear, left, or right are to be taken as being in reference to a normally upright, forward-pointing camera, or to a film cassette mounted therein.

FIGS. 1 through 11 show a cassette CA according to the present invention. The cassette CA comprises an outer protective case 1 which is made of a light-proof material of suitable stiffness and strength, such as thermosetting plastic, thin metal sheet, or thick cardboard. As shown in FIGS. 4, 5, the case 1 has a front opening 2 through which light may passed to expose a foremost monosheet 9, an extraction outlet 4 and a recharge inlet 5. The latter are, respectively, for extraction of exposed monosheets 9 from the cassette CA and supply thereinto of supplementary unexposed monosheets 9', as described in further detail below. The cassette CA may be freely mounted in, or removed from, an auto-process camera 50, as shown in FIGS. 19 and 22, which may be used in association therewith and comprises a complementary shaped portion 58 for accommodation of the cassette CA, as shown in FIG. 18. When the cassette CA is used as a recharge cassette, the top portion thereof is mounted in a recharge opening 203 at the bottom 50d of the camera 50. In this case, the cassette CA is held in attachment to the camera 50 by pins 95 which are provided at the left-hand and right-hand sides of the camera recharge opening 203 and which engage concave holes 3 formed near the upper ends of the left- and right-hand sides of the cassette CA, as shown in FIGS. 4, 5.

Monosheets 9 contained in the cassette CA are of a conventional type, each comprising a front, negative film portion MS1, which is backed by a positive film portion MS2, and on opposite sides of which there is provided a sac MS3 containing a solution of processing chemicals and a wiper board MS4 for removal of excess solution extruded from the sac MS3 during processing of the monosheet 9 after exposure thereof. As shown in FIG. 2, monosheets 9 are packed in the cassette CA in such a manner that the negative film portion MS1 of each monosheet 9 faces towards the front of the case 1, the sac MS3 thereof is uppermost, and the wiper board MS4 thereof is lowermost.

Figure 3:
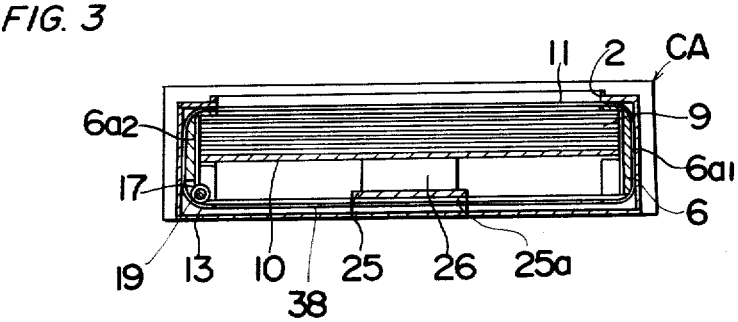
FIG. 3 is a cross-sectional view taken along the line III — III of FIG. 1.

In FIGS. 2, 3, monosheets 9 in the cassette CA are constantly urged forwards by a spring 26 which is mounted on a base portion 25 fixedly attached to the rear wall of the case 1 and which transmits pressure to the monosheets 9 through a pressure plate 10 contacting the rear side of the rearmost monosheet 9. Due to the pressure from the spring 26 and pressure plate 10, the foremost monosheet 9 in the cassette CA is pressed against the front wall of the case in a position in which the negative film portion MS1 thereof is exactly framed in the exposure opening 2 of the case 1, whereby the foremost monosheet 9 may be correctly exposed to light reflected from an external image and directed through the lens 52 of the camera 50. When the foremost monosheet 9 has been exposed and has been removed from the cassette CA in a manner described below, the remaining monosheets 9 are pushed forwards by the pressure plate 10, whereby the next foremost monosheet 9 is brought into contact with the front wall of the case 1 in readiness for the next shot. The base portion 25 extends vertically and generally parallel to the rear wall of the case 1. Extending through the base portion 25 there is formed a vertical slit 25a past which a light-proof sheet 11, as described below, may slide.

Figure 9:
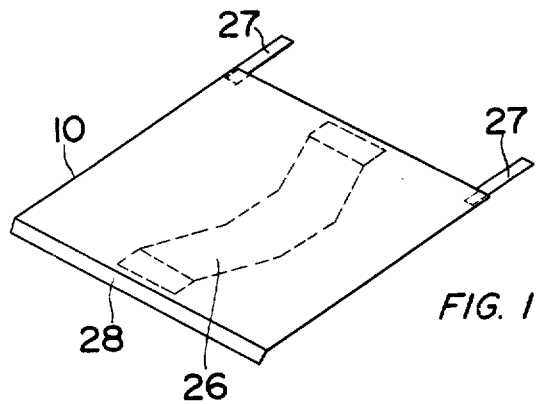
FIG. 9 is a perspective view of a pressure plate employed in the film cassette of FIG. 1.
Figure 10:
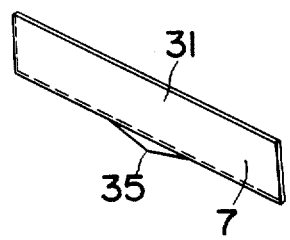
FIGS. 10 and 11 are perspective views of forwardly and rearwardly slidable covers employed in the film cassette of FIG. 1, respectively.
Figure 11:
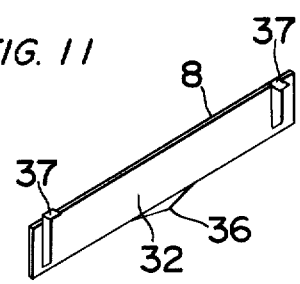

In FIG. 9, the bottom end 28 of the plate 10 is bent, or curved rearwards, out of contact with the rearmost monosheet 9, to permit easy insertion of supplementary monosheets 9'. A spring strip 27 is fixedly attached to, and extends upwardly from each upper corner of the plate 10. The spring strips 27 lie out of line with the sacs MS3 of the monosheets 9, and press the monosheets 9 towards friction rollers 12, as described below, whereby a foremost monosheet 9 may be removed from the cassette CA.

Prior to loading of the cassette CA into the camera 50, or during temporary unloading therefrom, the monosheets 9 are protected from exposure to light by the abovementioned light-proof sheet 11, which is tautly mounted on and around a frame 6.

Referring now to FIG. 7, the frame 6 may be seen to comprise left-hand and right-hand side walls 6a1, 6a2, which are generally rectangular and parallel to one another, two connection strips 6c1, one of which provides rigid connection between the top front corners of the side wals 6a1, 6a2, and the other of which provides rigid connection between the top rear corners thereof, and two connection strips 6c2, which similarly connect the front and rear bottom corners of the side walls 6a1, 6a2. The side walls 6a1, 6a2, and connection strips 6c1, 6c2 thus form the frame of a generally flat rectangular box which is open at the front, rear, top, and bottom. The dimensions of the front and of the rear of this box are generally equal to the large dimensions of the negative film portion MS1 and wiper board MS4, of a monosheet 9, and the thickness thereof, that is, the width of the side walls 6a1, 6a2, is slightly greater than the combined thickness of monosheets 9 packed in the cassette CA. The frame 6 fits without play in the case 1, and is protected thereby. Monosheets 9 contained in the cassette CA lie within the frame 6, the sacs MS3 thereof extending upwards, above the frame 6, into the upper portion of the case 1, as shown most clearly in FIG. 2. The frame 6 further comprises roller mounting boards 6b1, 6b2, which are fixedly attached to the tops of the side walls 6a1, 6a2, respectively and extend upwards therefrom and generally in line therewith.

The width of the light-proof sheet 11 is generally equal to the length of the side walls 6a1, 6a2, and the sheet 11 extends from the connection strips 6c 1 to the connection strips 6c2, and is stretched around the frame 6: that is, the light-proof sheet 11 lies between the frame 6 and the case 1. As mentioned earlier, the sheet 11 also passes by the slit 25a of the base portion 25. In other words, the spring 26 and pressure plate 10 also lie within the light-proof sheet 11, as shown most clearly in FIG. 3.

Continuing in reference to FIG. 7, the sheet 11 does not extend to the roller mounting boards 6b1, 6b2. The light-proof sheet 11 is a continuous sheet except for an opening 38 which is equal in dimensions to the exposure opening 2 of the case 1. The light-proof sheet 11 may be wound by friction rollers 13 to either of two positions, which are a position P and a position E. When the sheet 11 is in position P, the opening 38 thereof is brought to the rear of the frame 6, that is, opposite the rear wall of the case 1, whereby monosheets 9 in the cassette CA are protected from exposure, since light is prevented from passing through the exposure opening 2 of the case 1, as shown in FIG. 7. When the light-proof sheet 11 is in position E, the opening 38 thereof is brought into line with the exposure opening 2, thus permitting exposure of a foremost monosheet 9 in the cassette CA.

Alternatively, the opening 38 may be replaced by a transparent portion of the otherwise light-proof sheet 11.

At opposite points on the bottom edge of the sheet 11 there are attached small conductive foils 39, 40. The foils 39, 40 act as detection elements for detecting the rotational position of the sheet 11, and either foil 39 or 40 may contact terminals 65a which lead outside the case 1 to contact terminals 65b provided in the camera 50. The terminals 65b connect to a control box 65 which is provided in the camera 50 and controls actuation of a motor 66. The motor 66 supplies drive to the rollers 13, as described below, whereby the sheet 11 is rotated. When either foil 39 or 40 contacts and short-circuits the terminals 65a, drive from the motor 66 is stopped. The detection foil 39 is on the opposite side of the sheet 11 from the opening 38, and the detection foil 40 is on the same side of the sheet 11 as the opening 38, and directly in line with the centre thereof. The case 1 is also provided with contact terminals 41, which are located in a lower, generally central portion of the rear of the case 1, as indicated in FIG. 6. The contact terminals 41 are contactable by contacts 64 provided on the front side of a back cover 60 of the camera 50 (FIG. 18). Making or breaking of contact between the terminals 41 and contacts 64, that is, closure or opening of the cover 60, causes the motor 66 to be driven, and the sheet 11 to be rotated, until either the foil 40 or the foil 39 comes into contact with the terminal 65a.

As shown partially in FIG. 7, and in greater detail in FIG. 8, the friction rollers 13, for rotating the sheet 11, are provided adjacent to the top and bottom rear corners of the right-hand side wall 6a2 of the frame 6, and the sheet 11 is in close tight contact with arcs on the peripheries of the rollers 13. The rollers 13 are fixedly mounted on, and near opposite ends of, a rotatory shaft 19 which extends from the vicinity of the abovementioned roller mounting board 6b2 to the bottom of the side wall 6a2. The shaft 19 is accommodated in a longitudinal groove 17 which is formed near the rear inside edge of the side wall 6a2. Opposite ends of the shaft 19 are rotatably mounted in small, fixedly attached projection portions, one of which projects slightly leftwards from the mounting board 6b2. The upper friction roller 13 is driven by a bevel gear 20a which is fixedly mounted on the shaft 19, near the upper end thereof. Both rollers 13 being fixedly mounted on the shaft 19, both rollers 13 are, of course, rotated when the bevel gear 20a is rotated. The bevel gear 20a is driven by a bevel gear 20b, which is fixedly mounted on a shaft 20' which is rotatably mounted in and passes through the right-hand mounting board 6b2. A roller 21 is fixedly mounted on the other end of the shaft 20', that is on the outside of the mounting board 6b2. Drive to the roller 21, and hence to the bevel gears 20a, 20b and friction rollers 13, is supplied by a transmission roller 22, which is rotatably mounted on the outside of the mounting board 6b2, and which contacts the roller 21. The roller 22 is adjacent to and in line with a slit 24 which is formed near the top, front, right-hand corner of the case 1, as shown in FIGS. 4, 5. Drive to the roller 22 is provided by a drive roller 68 which is provided in the camera 50 in a position to contact the transmission roller 22 through the slit 24. The drive roller 68 is itself driven upon actuation of the abovementioned motor 66.

Referring again to FIG. 7, the abovementioned friction rollers 12 lie inside the mounting boards 6b1, 6b2, there being an upper roller 12 and a lower roller 12 adjacent to each board 6b1, 6b2. The upper rollers 12 are fixedly mounted on a connection shaft 14, one end of which is rotatably mounted in the right-hand board 6b2, and the other end of which is rotatably mounted in, and extends through, the left-hand board 6b1. A roller 15 is fixedly mounted on the left-hand end of the connection shaft 14, that is, outside the board 6b 1. The lower friction rollers 12 are similarly mounted on another connection shaft 14 rotatably mounted in the board 6b2, rotatably mounted in and passing through the board 6b1, and having a roller 15 fixedly mounted on the left-hand end thereof. The rollers 15 are contacted and driven by a transmission roller 16, which is rotatably mounted on the outside (the left-hand side) of the mounting board 6b1 and is adjacent to and in line with a slit 23 formed near the top, front, left-hand corner of the case 1 (FIGS. 4, 5). Drive to the transmission roller 16, and hence to the rollers 15 and friction rollers 12, is supplied by a drive roller 77 which is provided in the camera 50 and contacts the transmission roller 16 through the slit 23. It is to be noted that the mounting boards 6b1 6b2 extend to the top of the case 1, and the side walls 6a1, 6a2 extend to the bottom of the case 1. Accordingly, since the slits 23, 24 are formed externally, on the left and right respectively, of the frame 6, no light entering the slits 23, 24 can reach monosheets 9 lying within the frame 1.

The friction rollers 12 are accommodated in an upper, forward projection portion of the case 1: that is, the rollers 12 are located in line with the upper right-hand and left-hand portions of monosheets 9 in the cassette CA and lie forward of the foremost monosheet 9, as shown most clearly in FIG. 2. Still referring to FIG. 2, a normally open contact 105 is provided between and generally in line with the connection shafts 14. The contact 105 connects to two terminals 106 which are located at a generally central portion of the top, front edge of the case 1, as shown in FIG. 4, and extend to the outer surface of the case 1. The contact 105 is closed when a monosheet 9 is drawn from the cassette CA by the rollers 12, whereby the circuit between the terminals 106 is closed. When a cassette CA is being used as a recharge cassette CA', and is mounted in the recharge opening 203 of the camera 50, the terminals 106 connect to terminals 106a, which are provided in the camera 50, and form part of a delay control circuit which cuts drive to the rollers 12' of the recharge cassette CA' and causes the rollers 12 of the loaded cassette CA to be driven, as described in further detail below.

Continuing mainly in reference to FIG. 2, and also to FIGS. 4, 5, the abovementioned extraction outlet 4 and recharge inlet 5 are respectively provided directly above and directly below the location of a foremost monosheet 9 in the cassette CA. The extraction outlet 4 comprises two small walls adjacent to the top front edge of the case 1, and extending upwards from the top of the case 1. The recharge inlet 5 is constituted by a recessed portion, which is formed near the bottom front edge of the case 1 in line with the extraction outlet 4, and whose internal dimensions are generally equal to the external dimensions of the extraction outlet 4, whereby the extraction outlet 4 of one cassette CA may fit exactly into the recharge inlet 5 of another cassette CA'.

The outlet 4 and inlet 5 are normally sealed by forwardly and rearwardly slidable covers 7 and 8, respectively. The covers 7, 8 are straight boards which are normally urged forwards to cover the outlet 4 and inlet 5 by springs 35, 36 respectively, provided at the rear thereof, as shown also in FIGS. 10, 11. The cover 8 further comprises upwardly and rearwardly inclined hook portions 37 which are fixedly attached to the front edge of the cover 8, near the left- and right-hand sides thereof. When the cover 8 is drawn rearwards to permit a recharge monosheet 9' to be fed into a cassette CA', in a manner described below, the hook portions 37 engage the bottom edge of a foremost monosheet 9 already in the cassette CA', and at the same time as the cover 8 is drawn rearwards to open the inlet 5, the bottom edge of the foremost monosheet 9 (and of any other monosheets 9 in the cassette CA') is pulled slightly rearwards by the hook portions 37, and out of the way of the incoming recharge monosheet 9'. The hook portions 37 are preferably located so as not to contact a film surface of a monosheet 9, or 9'.

A connection pin 33 is fixedly attached to the outlet cover 7, projects upwardly therefrom, and fits slidably in and passes through a hole 29 formed in a generally central portion of the top of the case 1. The top end of the connection pin 33 is fixedly attached to an actuation piece 31 which is in close slidable contact with the outer surface of the top of the case 1. Upon actuation of the shutter of the camera 50, a lever 67 provided in the camera 50 is actuated to contact the actuation piece 31 and move it rearwards, whereby, due to the connection through the pin 33, the cover 7 is similarly moved rearwards, against the force of the spring 35, and the extraction outlet 4 is opened. The recharge inlet cover 8 is similarly attached to a downwardly projecting connection pin 34, which fits slidably in, and passes through a hole 30 formed in the bottom of the case 1. The connection pin 34 is attached to an actuation piece 32 that is in close, slidable contact with the outside surface of the bottom of the case 1. The actuation piece 31 may be contacted and moved rearwards by a lever 96 provided in the camera 50, whereby cover 8 is also moved rearwards, against the force of the spring 36, and the recharge inlet 5 is opened. The lever 96 is actuated upon depression of a recharge button 55 provided on the front of the camera 50, as shown in FIG. 26.

Reference is now had to FIGS. 15 through 26, in which there is shown an auto-process camera 50 which may be suitably used in association with cassettes CA of the invention. The camera 50 comprises a conventional lens mount portion 51 holding the camera lens 52 and projecting from the camera front 50a, viewfinder 53, shutter release button 54, and the abovementioned recharge button 55, which is provided in a bottom, left-hand portion of the camera front 50a, as shown in FIG. 15. In the camera top 50b there is formed a monosheet exit 56, which is normally sealed from dust and moisture by a fly-open cover 57 rotatably attached to the camera top 50b. In the camera bottom 50d, there is formed the abovementioned recharge opening 203 which is normally sealed by a cover 63 (FIG. 17, 18). As shown in FIGS. 16, 18, inside the rear portion of the camera 50, and above the recharge opening 203, there is formed the abovementioned cassette mounting portion 58. The camera back 50c forms an open portion 50c', which permits loading of a cassette CA into the camera 50, and which is normally sealed by the abovementioned light-proof back cover 60. The back cover 60 may be opened by depression of an opener button 61 provided near the right-hand edge of the camera back 50c. Above, and generally parallel to the top of the opening 50c, there is formed a transfer slit 59, through which processed monosheets 9 are transferred into a pocket 62, as described below. The transistor slit 59 is also above the top of the back cover 60, but is normally sealed by the top portion of the pocket 62. The pocket 62 is in fixed attachment to the rear of the back cover 60, is of suitable size to contain processed monosheets 9, and has a removal slit 206 (FIG. 16) through which processed monosheets 9 may be removed completely from the camera 50. At a generally central portion of the inside, that is, the front side, of the back cover 60, there are attached springs 92 which exert a forwards pressure to hold a cassette CA loaded in the camera 50 correctly in the mounting portion 58. At a generally central location at the bottom of the inside of the back cover 60 there are provided the abovementioned terminals 64 which are contactable by the terminals 41 associated with the light-proof sheet 11 of the cassette CA.

Referring now to FIGS. 19, 20, the terminals 64 connect to the control box 65, which controls the action of the motor 66, both the control box 65 and the motor 66 being provided in a right-hand portion of the interior of the camera 50. Output from the motor 66 is supplied through a bevel gear train 68a to the abovementioned drive roller 68, which contacts the transmission roller 22 adjacent to the slit 24 in the cassette CA and drives the transmission roller 22, whereby the light-proof sheet 11 is rotated.

Referring to FIGS. 18, 19, 20 and also referring back to FIGS. 7, 8, when the back cover 60 is opened and a cassette CA is loaded into the camera 50, the light-proof sheet 11 is in position P, that is, the opening 38 of the light-proof sheet 11 lies out of alignment with the exposure opening 2 of the case 1, and the detection foil 39 is in a position to contact the terminals 65a, which connect through the terminals 65b to the control box 65. There is no connection between the contact terminals 41 and contacts 64, since the cover 60 is open. When, however, the cover 60 is closed, the contacts 64 are brought into connection with the contact terminals 41, and the control box 65 actuates the motor 66, as described earlier. The motor 66, acting through the bevel gear train 68a, causes the drive roller 68 to rotate, the drive roller 68, which contacts the transmission roller 22 through the slit 24, drives the roller 22, and the light-proof sheet 11 is driven by the friction rollers 13 around the frame 6, from position P to position E, in which the opening 38 of the sheet 11 is in line with the exposure opening 2 of the case 1. When the sheet 11 comes to position E, the detection foil 39 is brought into contact with the terminals 65a, the motor 66 is stopped, and the sheet 11 remains in position E as long as the camera back cover 60 remains closed. In other words, monosheets 9 in the cassette CA may be exposed in order to obtain photographs of various scenes or objects.

If, before all the monosheets 9 in the cassette CA have been used, a photographer wishes to photograph a scene of a different type or with considerably different light conditions, and he accordingly wishes to employ monosheets having a different sensitivity to light, the photographer may open the back cover 60 to replace the cassette CA by another cassette CA' containing monosheets having the required qualities. When the back cover 60 is opened, breaking of the contact between the terminals 64 and terminal contacts 41 causes the motor 66 to be actuated, and the sheet 11 is therefore rotated from position E to position P. When the sheet 11 reaches position P, the detection foil 40 is brought into contact with the terminals 65a, and the motor 66 is stopped. In other words, remaining monosheets 9 in the cassette CA are protected from exposure and may be used, subsequently when required.

Control to actuate or stop the motor 66 may be effected in any conventionally known manner. For example, in one embodiment of the invention, the control box 65 comprises an R — S flip-flop FF1 which controls electrical supply to drive the motor 66, the motor 66 being driven when the R — S flip-flop FF1 conducts and being stopped when the R — S flip-flop FF1 does not conduct. Input to the setting terminals of the flip-flop FF1 is supplied from either a circuit A1 or a circuit A2. A1 is actuated to supply input when contact between the contact terminals 41 and contacts 64 is broken, A2 is actuated to supply input when contact between the contact terminals 41 and terminals 64 is made. Input to the reset terminal R of the flip-flop FF1 is supplied upon contact of either the detection foil 39 or the detection foil 40 with the terminals 65a .

The description will proceed below in reference to removal of an exposed monosheet 50 from the cassette CA, processing thereof, and transfer thereof to the pocket 62, means for which are illustrated in FIGS. 19 through 25.

In FIG. 19 there is shown the abovementioned lever 67, which may be actuated to open the cover 7 of the monosheet extraction outlet 4 of the cassette CA. The lever 67 extends from an upper right-hand portion of the camera 50 to a point which is approximately above the centre of the top of the cassette CA. As shown in FIG. 23, the lever 67 is pivotally mounted on a pin 204 attached to a mounting plate 204a which is fixedly attached to a fixed part of the camera 50. The left-hand portion of the lever 67 is contactable by a push-plate 69 which is attached to the camera back cover 60 by a spring 70. When the back cover 60 is closed, the push-plate 69 pushes the left-hand portion of the lever 67 downwards, whereby a contact portion 67a , which is formed at the extreme left-hand end of the lever 67, is brought into contact with the front of the actuation piece 31. The actuation piece 31 in turn connects through a pin 33 to the cover 7 of the monosheet extraction slit 4 (FIG. 2). The right-hand end of the lever 67 is in attachment to a spring 205 which continuously exerts a downwards force. When the back cover 60 is opened, the push-plate 69 is pulled out of contact with the lever 67 by the spring 70, and the spring 205 pulls the left-hand end of the lever 67 downwards, whereby the right-hand portion of the lever 67 is raised and does not hinder loading or removal of cassettes CA.

The right-hand portion of the lever 67 is also connected to a solenoid assembly 71. The solenoid assembly 71 is connected in a suitable manner to the shutter release mechanism of the camera 50 and is actuated to push the right-hand end of the lever 67 forwards when the shutter release mechanism is actuated to expose a foremost monosheet 9. Presuming that the cover 60 is closed and that there is a cassette CA loaded in the camera 50, when the shutter release button 54 is actuated and the right-hand portion of the lever 67 is moved forwards, the contact portion 67a is moved rearwards, pushing the actuation piece 31 of the cassette CA rearwards. The motion of the actuation piece 31 in turn pushes the cover 7 rearwards, and the extraction outlet 4 is opened. Simultaneously with this action, the front side of the right-hand portion of the lever 67 contacts and closes a main switch 72 which connects to a control box 94 provided in a left-hand portion of the camera 50. The control box 94 contains the necessary circuitry for effecting the actions described below. The control box 94 itself cannot function and the shutter release cannot be actuated until the fly-open cover 57 is opened to the position indicated by the dotted line portion of FIG. 22, in which position the cover 57 actuates a control box switch 200.

Referring to FIGS. 19, 21, 24, closure of the main switch 72 causes a motor 73 to be actuated and simultaneously causes clutches 74, 75 to engage. Drive from the motor 73 is supplied through the clutch 74 to a bevel gear train 76. Rotation of the bevel gear train 76 causes rotation of the abovementioned drive roller 77, which contacts the transmission roller 16 (FIG. 7), through the slit 23 of the case 1, and causes the friction rollers 12 to be rotated. The foremost monosheet 9, which has just been exposed, being pressed into contact with the rollers 12 by the spring strips 27 attached to the pressure plate 10 (FIG. 2, 9), rotation of the friction rollers 12 causes this exposed monosheet 9 to be drawn upwards and through the extraction outlet 4, which has been opened by the lever 67. This exposed monosheet 9 continues to be drawn upwards, and out of the cassette CA, as long as the clutch 74 remains engaged during actuation of the motor 73. Drive from the motor 73 is supplied through the other clutch 75 to a bevel gear train 78, which is provided in an upper left-hand portion of the camera 50, and which transmits drive to a main roller 79.

Referring to FIGS. 19, 21, the main roller 79 contacts one end of and drives a press roll 80a, and also contacts and drives follower rolls 81, 82.

In FIG. 22, a roller 88, which is provided in an upper rear portion of the camera 50, is mounted on the same shaft as the follower roll 81, and is driven when roll 81 is driven by the main roller 79. Similarly, rotation of the follower roll 82 causes rotation of a roller 90 which is mounted on the same shaft as the follower roll 82, and is adjacent to the abovementioned transfer slit 59 leading to the pocket 62. The roller 90 drives a feed roller 91 which is located inside the pocket 62, near the top thereof, and generally in line with the transfer slit 59.

As shown in FIGS. 19, 22, 25, the press roll 80a is associated with another press roll 80b, the rolls 80a, 80b being disposed in an upper portion of the camera 50, and being generally in line with the extraction outlet 4 of the cassette CA, whereby the leading end of the exposed monosheet 9 being removed from the cassette CA by the friction rollers 12 is brought between the press rolls 80a, 80b (FIG. 25a), and the monosheet 9 is drawn upwards by the press rolls 80a, 80b (FIG. 25b) while at the same time the processing solution in the sac MS3 of the monosheet 9 is extruded therefrom to develop the image formed on the negative film portion MS1 thereof. The press roll 80b is normally held in contact with the press roll 80a by a spring (not shown). When the exposed monosheet 9 is brought between the press rolls 80a, 80b, the press roll 80b is moved away from the press roll 80a, against the force of the spring, and closes a contact 83 which is provided adjacent to the roll 80b. Closure of the contact 83 causes the clutch 74 to disengage, whereby, although the motor 73 is still actuated, drive to the friction rollers 12 ceases, and only the foremost, exposed monosheet 9 is moved from the cassette CA. The contact 83 also supplies a control signal to a delay circuit which actuates a solenoid assembly 84 associated with a pivotable guide block 85.

Although the clutch 74 is disengaged and the friction rollers 12 are no longer actuated, the main roller 79, press rolls 80a, 80b, follower rolls 81, 82, rollers 88, 90, and feed roller 91 continue to be driven, since the clutch 75 is still engaged. The exposed monosheet 9 therefore continues to be drawn upwards by the press rolls 80a, 80b, and is led thereby into a guide passage 86 formed in the guide block 85 (FIG. 25b). A friction roller 87 is provided at the bottom and rear of the guide block 85. The friction roller 87 extends slightly into the guide passage 86 and exerts sufficient pressure to prevent downward slippage of the exposed monosheet 9. As the exposed monosheet 9 is drawn upwards, it passes through the monosheet exit 56 formed in the top of the camera 50, until the main portion thereof projects above the top of the camera 50, and only the rear portion, remains in the guide passage 86, as shown in FIG. 25c. When the rear end of the exposed monosheet 9 has passed through the pass rolls 80a, 80b, the abovementioned delay circuit controlled by the contact 83 actuates the solonoid assembly 84, which thereupon pushes the lower end of the guide block 85 rearwards, causing the guide block 85 to pivot into a position in which the friction roller 87 is brought into contact with the roller 88, as indicated in FIG. 25d. Rotation of the roller 88 causes the friction roller 81 to rotate and draw the exposed monosheet 9 downwards through the passage 86 of the guide block 85. The exposed monosheet 9 is moved downwards onto a guide plate 201 leading to the transfer slit 59 and is guided thereby through the slit 59 and into contact with the feed roller 91, which feeds the exposed monosheet 9 completely into the pocket 62. As the exposed monosheet 9 is fed through the slit 59, the exposed monosheet 9 causes a contact plate 89, which is pivotally mounted adjacent to the slit 59 (FIG. 22), to move and actuate a switch 93. The switch 93 controls a delay circuit which after a delay sufficient to allow the exposed monosheet 9 to be fed completely into the pocket 62, deenergizes the solenoid assembly 71 which is holding the lever 67 in a position in which the lever 67 closes the main switch 72. The lever 67 is thereupon moved back to its original position, the main switch 72 being turned off. The clutch 75 is disengaged, the motor 73 stops, rotation of the main roller 79, and of other rolls or rollers driven thereby, ceases, and the cover 7 of the extraction outlet 4 of the cassette CA is moved forwards by the spring 35 to cover the outlet 4 again. In other words, the camera 50 is now ready for exposure of the next foremost monosheet 9 in the cassette CA, in which case the abovedescribed operation is repeated.

The description will now proceed in reference to recharging a cassette CA loaded in the camera 50 with supplementary monosheets 9' from a recharge cassette CA'.

When it is desired to supply supplementary monosheets 9' into the cassette CA, the bottom cover 63 of the camera 50 is opened (FIG. 17), and the top of the recharge cassette CA' is fitted into the recharge opening 203 of the camera 50 (FIG. 18). In this position the extraction outlet 4' of the recharge cassette CA' fits into the recharge inlet 5 of the loaded cassette CA (FIG. 12, 16), and the pins 95, which are on the right-hand side and left-hand side of the recharge opening 203 (FIG. 19), engage the holes 3, which are formed near the upper ends of the left- and right-hand sides of the recharge cassette CA' (FIGS. 4, 5), whereby the recharge cassette CA' is held in position without support from the photographer. Recharge of supplementary monosheets 9' is effected by repeated depression of the camera recharge button 55 (FIG. 15). The description will proceed with reference to supply of a single supplementary monosheet 9' into the loaded cassette CA, it being understood that operation is the same for supply of other supplementary monosheets 9'.

Depression of the recharge button 55 closes a switch 100 provided in the camera 50. Upon closure of the switch 100, a solenoid assembly 99, which is associated with the abovementioned lever 96, is actuated. As shown in FIG. 19, the lever 96 is provided near the bottom of the camera 50 and extends from a right-hand portion thereof to an approximately central point of the recharge opening 203, whereby the lever 67 lies between the recharge cassette CA' and a loaded cassette CA when supplementary monosheets 9' are to be supplied to the loaded cassette CA. The left-hand end of the lever 96 forms a contact portion 96a which contacts the actuation piece 31' connected to the extraction outlet cover 7' of the recharge cassette CA' and the actuation piece 32 connected to the recharge inlet cover 8 of the loaded cassette CA, as shown in FIG. 26. The lever 96 assembly may be seen to be similar to that of the lever 67. The lever 96 is pivotally mounted on a pin 97a attached to a mounting plate 97 which is fixedly attached to a fixed part of the camera 50. When the solenoid assembly 99 is actuated, the lever 96 is pivoted in such a manner that the contact portion 96a thereof is moved rearwards, and at the same time the right-hand portion of the lever 96 closes a switch 101. Closure of the switch 101 causes the abovementioned motor 73 to be actuated and simultaneously causes engagement of a clutch 102 which is provided below the motor 73. When the clutch 102 is engaged, drive from the motor 73 is supplied through a bevel gear train 103 to a drive roller 104 (FIG. 19). The drive roller 104 contacts the transmission roller 16' of the recharge cassette CA' through the slit 23' of the recharge cassette CA'.

In reference now to FIG. 12, when the contact portion 96a of the lever 96 is moved rearwards, the contact portion 96a pushes the actuation pieces 31', 32 rearwards, whereby the extraction outlet cover 7' of the recharge cassette CA' and recharge inlet cover 8 of the loaded cassette CA are likewise moved rearwards, opening the extraction outlet 4' and recharge inlet 5 of the recharge cassette CA' and loaded cassette CA, respectively, as indicated in FIG. 12b. When the recharge inlet cover 8 of the loaded cassette CA is thus drawn rearwards, the hook portions 37 thereof draw the lower portion of the monosheets 8 slightly rearwards, as described earlier, and as shown in FIGS. 12b, c, whereby a supplementary monosheet 9' may be supplied without hindrance into the loaded cassette CA. At the same time, drive being supplied to the recharge cassette transmission roller 16' by the drive roller 104, the friction rollers 12' of the recharge cassette CA are rotated, and a foremost monosheet 9' in the recharge cassette CA' is transferred through the extraction outlet 4' and recharge inlet 5 into the loaded cassette CA, and becomes the foremost monosheet therein, as indicated in FIG. 12b. When the supplementary monosheet 9' starts to move past the recharge cassette rollers 12', the abovementioned contact 105', which connects through terminals 106a' to terminals 106b provided in the camera 50, is closed. Closure of the contact 105' actuates a delay circuit provided in the control box 94. After the monosheet 9' has had time to reach a position in which the monosheet 9' bridges the recharge cassette rollers 12' and loaded cassette rollers 12, this is, when the leading end of the monosheet 9' contacts the rollers 12 and the rear end thereof contacts the rollers 12', the control box 94 causes the clutch 102 to disengage and simultaneously causes the clutch 74 to engage. Rotation of the recharge cassette rollers 12' therefore ceases, and at the same time drive is supplied from the motor 73 to the loaded cassette rollers 12, whereby the monosheet 9' is drawn completely into the loaded cassette CA, to the position indicated in FIG. 12c. As soon as the monosheet 9' is completely in the loaded cassette CA and correctly located at the foremost position therein, the solenoid assembly 99 is deenergized, the switch 101 is turned off, and the contact portion 96a of the lever 96 moves forwards. The motor 73 therefore stops, and the monosheet 9' remains in position. At the same time the covers 7', 8 are moved forwards by the springs 35', 36, respectively, and the extraction outlet 4' and recharge inlet 5 are closed, as indicated in FIG. 12d. When the recharge inlet cover 8 of the loaded cassette CA is moved forwards, the hook portions 37 attached thereto ride over the lower end of the monosheet 9' which has been supplied into the loaded cassette CA, so that when the recharge button is pressed again, to effect supply to another supplementary monosheet 9'' into the loaded cassette CA, the lower end of the supplementary monosheet 9', as well as the lower ends of the monosheets 9 previously in the loaded cassette CA, is moved rearwards upon rearwards movement of the recharge inlet cover 8. Needless to say, the abovedescribed action requires a very short time only, and, to effect supply of a plurality of supplementary monosheets 9' into the loaded cassette CA, it is simply necessary for the photographer to depress the recharge button 55 a number of the times in rapid succession.

In FIGS. 13, 14, there is shown a cassette CA'' which is intended for use exclusively as a recharge cassette. The cassette CA'' requires no provision of a recharge inlet, light-proof sheet, or associated means, but is constituted by a simple case 1'' provided with an extraction outlet 4'' and association means, and a spring 26'' and pressure plate 10'' for moving successive monosheets contained in the cassette CA'' to a foremost position in line with the extraction outlet 4''.

As is clear from the above description, the present invention provides a film cassette which is of simple, sturdy construction, which permits recharging with supplementary monosheets when required, and which also permits unloading or reloading of the cassette, in accordance with the requirements of different situations, without any, detriment to monosheets contained therein. The invention thus offers advantages of economy and flexibility in the exercise of the photographic art.

What is claimed is:

1. A film cassette for containing monosheets or similar films, said cassette comprising:
    1. a protective case made of a light-proof material in which monosheets may be packed and having
        a. a front opening through which light may be passed to expose a foremost monosheet in said case and
        b. an extraction outlet which is in line with the position of a foremost monosheet in said case and through which such a foremost monosheet may be withdrawn from said case;
    2. a pressure means for urging monosheets in said case towards the front of said case, whereby successive monosheets may be brought to the foremost position for exposure;
    3. a movable light-proof sheet within said case for protecting monosheets in said case from exposure to light;
    4. a means for removing said light-proof sheet from said front opening of said case to expose the foremost monosheet in said case to light;
    5. an extraction outlet cover normally sealing said extraction outlet but actuable to open said extraction outlet when the foremost monosheet is withdrawn from said case;
    6. a recharge inlet formed at the opposite side of said case from said extraction outlet, whereby monosheets may be supplied into said case;
    7. a recharge inlet cover normally sealing said recharge inlet but actuable to open said recharge inlet; and
    8. an externally actuable drive means for drawing the foremost monosheet in said case through said extraction outlet when the cassette is mounted in a camera.

2. A film cassette as recited in claim 1, wherein said cover for sealing said recharge inlet is actuable by a means provided in a camera to open said recharge inlet.

3. A film cassette as recited in claim 1, wherein said recharge inlet has a shape complementary to that of said extraction outlet, whereby said recharge inlet of a first cassette as claimed hereby is capable of fitting into said extraction outlet of a second cassette as claimed hereby, permitting monosheets in said second cassette to be supplied into said first cassette through said extraction outlet of the second cassette and said recharge inlet of the first cassette when both said cover for sealing said extraction outlet of the second cassette and said cover for sealing said recharge inlet of the first cassette are opened.

4. A film cassette as recited in claim 1 and further comprising a means for engaging and drawing aside end portions of monosheets contained in said case upon opening of said recharge inlet cover to make it easy to supply monosheets without hindrance into said case through the recharge inlet thereof.

* * * * *